United States Patent Office 3,185,570
Patented May 25, 1965

3,185,570
STABILIZED LIGHT-SENSITIVE EMULSIONS
John A. Welsh, Binghamton, N.Y., assignor to General Aniline & Film Corporation, New York, N.Y., a corporation of Delaware
No Drawing. Filed Dec. 18, 1962, Ser. No. 245,377
4 Claims. (Cl. 96—109)

The present invention relates, in general, to photography and, in particular, to stabilized photographic emulsions.

It is well known that light-sensitive emulsions, such as gelatin silver halide emulsions, have a decided tendency to fog. The fog may be of two types, namely, yellow fog and chemical (gray) fog. The yellow fog, sometimes referred to as color fog or dichroic fog, is essentially a colloidal deposit of silver, the color intensity and general appearance of which are determined by the minute particle size and degree of subdivision. The fog is chiefly yellow in color and is most apparent in the lighter portions of a negative. The color may vary, however, and the colloidal silver particles may, for example, appear green by reflected light, and yellow or red by transmitted light. On the other hand, the so-called chemical fog, or gray fog is the more common and is formed in a number of ways. It may be caused by premature exposure, excessive ripening of the emulsions, or by storage of the film at high temperatures or for unusually long periods of time.

Accordingly, it is an object of this invention to provide a stabilizer for silver halide emulsions.

Another object of this invention is to provide a stabilizer of fog inhibiting agent as an ingredient in silver halide emulsions to prevent the formation of fog in light-sensitive silver halide emulsions.

Still other objects and advantages of the invention will become further apparent from the following detailed description of the invention.

The above and other objects of the invention are accomplished in accordance with the present invention by incorporating into a layer of a photographic element 4-hydroxypyrazole(3,4d)pyrimidine of the structural formula:

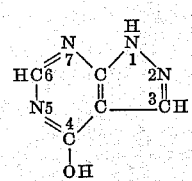

The pyrimidine derivative utilized for the purposes of this invention is prepared from 3-aminopyrazole-4-carboxamide hemisulfate by heating the same with formamide at an elevated temperature in accordance with the procedure set forth and described in Jour. Am. Chem. Soc., vol. 78, pp. 788.

The stabilizer thus formed can be applied in a variety of ways to impart stability to photographic elements. For example, it can be applied as a constituent of the emulsion, as a constituent of a surface layer over the emulsion or over the base or support. Additionally, the stabilizer can be applied to the otherwise finished photographic element by bathing the same in an alcohol or alcohol-water solution containing the stabilizer.

In addition to being useful in orthochromatic and panchromatic emulsions, it can also be used in non-sensitized emulsions, X-ray emulsions, paper emulsions, color emulsions and the like. If used with sensitizing dyes, it can be added to the emulsion before or after the dyes are added. The stabilizers are equally useful when added to photographic silver halide developer solutions used in the development of imagewise-exposed silver halide emulsions.

The stabilizer may also be employed in conjunction with known antifoggants and stabilizers, reduction sensitizers, metal and noble metal sensitizers, or in combination with other additive agents and the like.

The stabilizer may also be employed in gelatin or other colloid, such as polyamides or a mixture of gelatin with a polyamide as described in United States Patent 2,289,775; polyvinyl alcohol and jelling compound as described in United States Patent 2,249,537; polyvinyl acetaldehyde acetal resins and partially hydrolyzed acetate resins described in United States Patents 1,939,422 and 2,036,092; cellulose derivatives, e.g., cellulose nitrate, cellulose acetate, and the lower fatty acid esters of cellulose including simple and mixed esters and ethers of cellulose, and the like, as an under or overcoat for the emulsion, or as a backing layer for the support.

In the preparation of an emulsion containing the stabilizer in accordance with the invention, a solution of the stabilizer in a suitable solvent, such as water, alcohol, dimethyl formamide or alcohol-water mixture adjusted to a neutral or slightly alkaline pH, i.e., about 7.5 to 10, is made up and the solution mixed with the emulsion at any point during its preparation, but preferably during ripening or just prior to coating in concentrations varying from 5 to 500 milligrams (preferably from 20 to 200 milligrams) per liter of emulsion depending on the type of emulsion employed. Expressed in terms of silver halide present in the emulsion, the above amounts of stabilizer correspond essentially to 0.6 mole of silver halide present in the emulsion.

The method of testing the stabilizer in the following examples consists of coating several film supports, such as cellulose acetate, one with the photographic stabilizer of the invention, one without, and one with a conventional stabilizer, storing the emulsions in an incubator for six days at 50° C., then exposing, developing, fixing and washing the same under standard conditions. The fog density or blackening produced in the unexposed areas of the emulsions is then measured in a standard transmission desensitometer.

The following examples will serve to illustrate the practice of the invention.

PREPARATION

Seven and one-half grams of 3-aminopyrazole-4-carboxamide hemisulfate was mixed with 20 cubic centimeters of formamide and heated in a metal bath at 180–190° C. for 45 minutes. After cooling, the solution was diluted with 100 cubic centimeters of cold water and filtered. The filtered product was recrystallized from water and provided 2.6 grams of 4-hydroxypyrazole-(3,4d)pyrimidine having a melting point of 320° C. as white micro crystals.

*Example I*

The above stabilizer was incorporated into a bromoiodide emulsion of the type used in pictorial photography in a concentration of 50 cubic centimeters of a 1% by weight solution to 10 kilograms of emulsion along with saponin as a wetting agent. A control consisting of an unstabilized emulsion and one containing a conventional, commercially used stabilizer in a concentration of 100 cubic centimeters of a 2% by weight solution per 10 kilograms of emulsion. Three photographic films coated with three above-described emulsions and stored in an incubator for six days at 50° C. and 50% relative humidity, exposed, developed in an Ansco A–47 developer, fixed and washed under the same conditions. The fog density produced in the unexposed areas of the three emulsions was measured and the following results were found:

|  | Fog | Relative speed | Gamma |
|---|---|---|---|
| Emulsion | 0.90 | 45 | 0.43 |
| Emulsion plus conventional stabilizer | 0.53 | 100 | 0.44 |
| Emulsion plus 4-hydroxypyrazole(3,4d)pyrimidine | 0.14 | 130 | 0.79 |

The Ansco A-47 developer has the following composition:

| | Grams |
|---|---|
| p-Methylaminophenol sulfate | 1.5 |
| Sodium sulfite, anhydrous | 45 |
| Sodium bisulfite | 1 |
| Hydroquinone | 3 |
| Sodium carbonate, monohydrated | 6 |
| Potassium bromide | .8 |

Water to make 1 liter.

*Example II*

Example I was repeated with the exception that the stabilizer of the invention was incorporated into the emulsion at a concentration of 100 cubic centimeters of the 1% by weight solution per 10 kilograms of emulsion with similar results.

Various modifications of the invention will occur to persons skilled in the art. Thus, it is evident that in lieu of using the compound of the specific examples, any of the compounds mentioned in the specification can be readily employed with similar results. Therefore, it is not intended that the invention be limited in the patent granted except as necessitated by the appended claims.

What is claimed is:

1. A light-sensitive silver halide emulsion containing as a stabilizer, in an antifogging and stabilizing amount, 4-hydroxypyrazole(3,4d)pyrimidine.

2. A light-sensitive silver halide emulsion as recited in claim 1 wherein the concentration of the stabilizer varies from 5 to 500 milligrams per liter of emulsion.

3. A light-sensitive photographic material comprising a base and a light-sensitive silver halide emulsion, said light-sensitive material containing as a stabilizer therefor, 4-hydroxypyrazole(3,4d)pyrimidine.

4. A process of preventing the formation of fog in photographic silver halide emulsions which comprises carrying out the development of the imagewise-exposed silver halide emulsions in the presence of an antifogging amount of 4-hydroxypyrazole(3,4d)pyrimidine.

References Cited by the Examiner

FOREIGN PATENTS 701,054   12/53   Great Britain.
716,327   10/54   Great Britain.

NORMAN G. TORCHIN, *Primary Examiner.*